United States Patent
Lim et al.

(10) Patent No.: US 9,930,107 B2
(45) Date of Patent: Mar. 27, 2018

(54) METHOD AND APPARATUS FOR LOAD BALANCING IN COMMUNICATION SYSTEM

(71) Applicant: Samsung Electronics Co., Ltd., Gyeonggi-do (KR)

(72) Inventors: Hae-Jung Lim, Gyeonggi-do (KR); Hong-Seok Yang, Gyeonggi-do (KR); Jai-Jin Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 587 days.

(21) Appl. No.: 14/364,047

(22) PCT Filed: Nov. 26, 2012

(86) PCT No.: PCT/KR2012/010034
§ 371 (c)(1),
(2) Date: Jun. 9, 2014

(87) PCT Pub. No.: WO2013/085194
PCT Pub. Date: Jun. 13, 2013

(65) Prior Publication Data
US 2014/0372571 A1    Dec. 18, 2014

(30) Foreign Application Priority Data

Dec. 9, 2011   (KR) .................. 10-2011-0131524

(51) Int. Cl.
*H04L 29/08* (2006.01)
*H04L 12/26* (2006.01)
*H04L 29/06* (2006.01)

(52) U.S. Cl.
CPC ...... *H04L 67/1008* (2013.01); *H04L 43/0817* (2013.01); *H04L 67/1004* (2013.01); *H04L 63/08* (2013.01)

(58) Field of Classification Search
CPC . H04L 67/1008; H04L 43/0817; H04L 63/08; H04L 29/08144; H04L 29/08153;
(Continued)

(56) References Cited

U.S. PATENT DOCUMENTS 6,247,057 B1 *   6/2001   Barrera, III ............ H04L 29/06
                                                    709/203
7,844,745 B1    11/2010   Darbyshire et al.
(Continued)

FOREIGN PATENT DOCUMENTS

WO    WO 2009/070179 A1    6/2009

OTHER PUBLICATIONS

European Search Report dated Jun. 15, 2015 in connection with European Patent Application No. 12855269.2, 6 pages.
(Continued)

*Primary Examiner* — Aaron Strange (57) ABSTRACT

Provided is a method for balancing load of a server in a communication system. The method includes receiving, by a client, a new access request message; checking load status of servers that the client itself manages; selecting a lowest-load server among the servers as a server to which the client is to send the new access request message; and sending the new access request message to the selected server.

14 Claims, 5 Drawing Sheets

(58) Field of Classification Search
CPC .......... H04L 29/08738; H04L 67/1002; H04L 67/1004
See application file for complete search history.

(56) References Cited

U.S. PATENT DOCUMENTS

| | | | |
|---|---|---|---|
| 2002/0055983 A1* | 5/2002 | Goddard | H04L 29/06 709/217 |
| 2003/0140151 A1* | 7/2003 | Daenen | H04L 63/0272 709/229 |
| 2003/0195962 A1 | 10/2003 | Kikuchi et al. | |
| 2003/0200277 A1* | 10/2003 | Kim | G06Q 20/401 709/217 |
| 2004/0095881 A1 | 5/2004 | Borella et al. | |
| 2008/0022136 A1* | 1/2008 | Mattsson | G06F 21/6227 713/194 |
| 2011/0161681 A1* | 6/2011 | Dhuse | G06F 11/1092 713/193 |
| 2011/0231917 A1* | 9/2011 | Chaturvedi | H04L 29/08846 726/8 |
| 2011/0252127 A1 | 10/2011 | Iyengar et al. | |
| 2011/0271005 A1* | 11/2011 | Bharrat | H04L 61/1511 709/232 |
| 2012/0203910 A1* | 8/2012 | Lan | H04L 67/1029 709/226 |
| 2013/0275583 A1* | 10/2013 | Roach | H04L 43/08 709/224 |

OTHER PUBLICATIONS

International Search Report dated Feb. 27, 2013 in connection with International Patent Application No. PCT/KR2012/010034, 3 pages.
Written Opinion of International Searching Authority dated Feb. 27, 2013 in connection with International Patent Application No. PCT/KR2012/010034, 4 pages.

\* cited by examiner

| AAA SERVER'S REAL-TIME LOAD | VALUE OF LOAD INDICATOR | CPU LOAD WEIGHT | BUFFER LOAD WEIGHT | # OF USER LOAD WEIGHT |
|---|---|---|---|---|
| 20% OR LESS | 1 | 5 | 10 | 5 |
| 20% ~ 40% | 2 | 4 | 8 | 4 |
| 40% ~ 60% | 3 | 3 | 6 | 3 |
| 60% ~ 80% | 4 | 2 | 4 | 2 |
| 80% ~ 100% | 5 | 1 | 2 | 1 |

METHOD AND APPARATUS FOR LOAD BALANCING IN COMMUNICATION SYSTEM

CROSS-REFERENCE TO RELATED APPLICATION(S)

The present application claims priority under 35 U.S.C. §365 to International Patent Application No. PCT/KR2012/010034 filed Nov. 26, 2012, entitled "METHOD AND APPARATUS FOR LOAD BALANCING IN COMMUNICATION SYSTEM". International Patent Application No. PCT/KR2012/010034 claims priority under 35 U.S.C. §365 and/or 35 U.S.C. §119(a) to Korean Patent Application No. 10-2011-0131524 filed Dec. 9, 2011 and which are incorporated herein by reference into the present disclosure as if fully set forth herein.

TECHNICAL FIELD

The present invention relates generally to a communication system, and more particularly, to a method and apparatus for balancing load in a communication system that uses a Remote Authentication Dial In User Service (RADIUS) protocol.

BACKGROUND ART

Description of the Related Art

RADIUS is a protocol used for authentication and accounting between a Network Access Server (NAS) and an Authentication, Authorization and Accounting (AAA) server in a computer network, and its protocol standard is defined by RFC2865. An AAA server and a client exchange information using RADIUS protocol messages, thereby to handle authentication and accounting for users.

Figure 1:
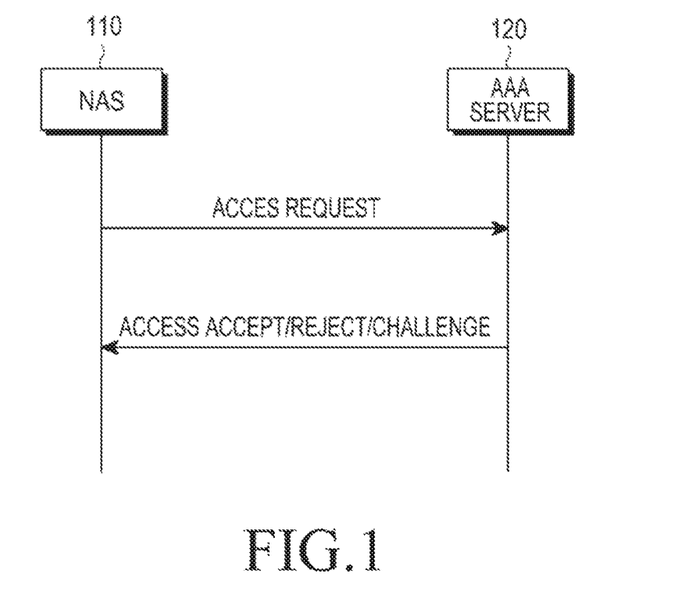
FIG. 1 shows a procedure for exchanging messages using a general RADIUS protocol.

FIG. 1 shows a procedure for exchanging messages using a general RADIUS protocol.

Referring to FIG. 1, if a NAS 110, a RADIUS client, requests authentication by sending an Access Request message including a user name, a password, a certificate or the like to an AAA server 120, a RADIUS server, in step 101, then the AAA server 120 sends an Access Accept, Access Reject, or Access Challenge message in response thereto after performing authentication for the client 110 in step 103. The Access Accept message is sent to approve the access, the Access Reject message is sent to reject the access, and the Access Challenge message is sent to require additional information such as a PIN or password, a token, and the like.

A client needs to determine the load status of a server, for its smooth communication with the server. For example, if the load of the server has reached a threshold, the client may not send an access request message to the server at its discretion. Also, if the number of servers increases to two or more due to the increase in the number of subscription users, the client may perform efficient load balancing so that authentication requests received from terminals may not be concentrated on a specific server.

DISCLOSURE OF INVENTION

Technical Problem

However, in the conventional RADIUS protocol, a client may not determine the load status of a server. Therefore, the client may send an access request message without considering the load of the server, and the server may not handle the access request message due to the overload. However, the client may not determine whether its message transmission is failed due to the overload of the server or the software error. Therefore, if the client continuously fails in message transmission even after repeatedly sending an access request message to the server at stated periods a predetermined number of times, the client may no longer send the access request message. In addition, generally, only one server has been used, and sometimes, when multiple servers are used, they are sequentially allocated to the client on a round robin basis, or a limited load balancing method has been used.

As described above, in the conventional RADIUS protocol, a client may not actively cope with changes in the load status of a server because it cannot determine the load status of the server. However, if the client can determine the load status of the server and if the client may control its transmission of an access request message depending on the load status of the server, it may prevent unnecessary retransmission. In addition, when using multiple servers, the client needs to perform a load balancing operation to uniformly allocate an access request message to each server. These load balancing methods may be classified into manual load balancing which is performed according to a predetermined process, and dynamic load balancing which is dynamically performed depending on the load status of the network. Compared to the manual load balancing, the dynamic load balancing is flexible and may bring significant improvement in the system performance. Real-time load balancing that determines the load status in real-time and distributes the load depending on the load status, may belong to the dynamic load balancing. However, with the current RADIUS protocol structure, the client may not determine the load status of the server, making it difficult to implement load balancing like the real-time load balancing.

Solution to Problem

An aspect of an exemplary embodiment of the present invention is to provide a method and apparatus for allowing a client to determine load status information of a server in real-time, and to perform load balancing based on this information.

Another aspect of an exemplary embodiment of the present invention is to provide a method and apparatus for allowing a client to receive and store load status information from a server, and to perform load balancing based on this information.

In accordance with one aspect of the present invention, there is provided a method for balancing load of a server in a communication system. The method includes receiving, by a client, a new access request message; checking load status of servers that the client itself manages; selecting a lowest-load server among the servers as a server to which the client is to send the new access request message; and sending the new access request message to the selected server.

In accordance with another aspect of the present invention, there is provided an apparatus for balancing load of a server by a client in a communication system. The apparatus includes a transceiver for receiving a new access request message; and a controller for checking load status of servers that the client manages, selecting a lowest-load server among the servers as a server to which the client is to send the new access request message, and controlling the transceiver to send the new access request message to the selected server.

Advantageous Effects of Invention

As is apparent from the foregoing description, according to the present invention, a client manages load status information of a server(s) in real-time, making it possible to perform active operation depending on the load status of the server.

In addition, according to the present invention, a client detects the load status of a server by itself without the help of a server, and allocates jobs to the server depending on the detection results, making it possible to perform efficient load balancing even for multiple servers and also to control a flow depending on the load status of each individual server.

While the invention has been shown and described with reference to certain exemplary embodiments thereof, it will be understood by those skilled in the art that various changes in form and details may be made therein without departing from the spirit and scope of the invention as defined by the appended claims and their equivalents.

BRIEF DESCRIPTION OF DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

BEST MODE FOR CARRYING OUT THE INVENTION

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides a method for allowing a client to determine and manage the load status of a server and to balance the load of the server based on the load status in a communication system that uses a RADIUS protocol.

First Embodiment

A first embodiment of the present invention provides a method in which a client estimates the load status of a server using its own buffer.

A RADIUS client manages a buffer it will use for a RADIUS message, individually for each RADIUS server. In accordance with the RFC2865 standard, an Identifier (ID) of a RADIUS message may have a value between 0 and 255, and a client monitors which of the 256 IDs is now in use for a request/response process, to calculate ID utilization, and estimates the ID utilization as the load status of each RADIUS server.

Figure 2:
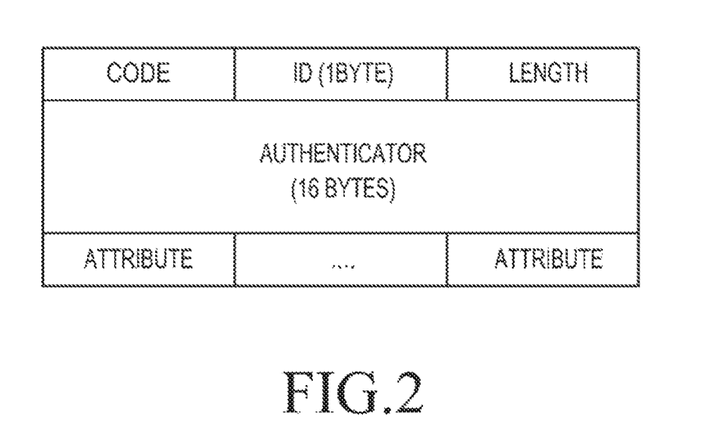
FIG. 2 shows a header structure of a RADIUS message according to a first embodiment of the present invention

FIG. 2 shows a header structure of a RADIUS message according to a first embodiment of the present invention. As shown in FIG. 2, a header of a RADIUS message includes a 1-byte message ID. The message is stored in a buffer after its ID is mapped thereto. As for a message ID according to an embodiment of the present invention, a client assigns at random a value of an unused ID among the 256 IDs during generation of a new message. In this specification, the buffer, in which an ID of each message is stored after it is mapped to the message as described above, will be defined as an ID buffer.

Figure 3:
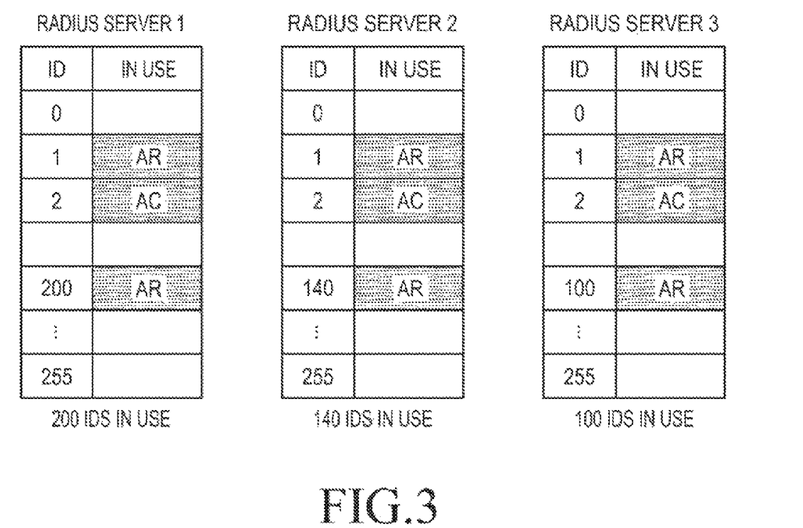
FIG. 3 shows usage of ID buffers according to a second embodiment of the present invention

FIG. 3 shows usage of ID buffers according to a second embodiment of the present invention. In the example of FIG. 3, three servers are used.

As shown in FIG. 3, a client manages three ID buffers corresponding to their associated servers. Specifically, 200 IDs are in use in an ID buffer corresponding to a first server, 140 IDs are in use in an ID buffer corresponding to a second server, and 100 IDs are in use in an ID buffer corresponding to a third server. In FIG. 3, AR represents Access Request, and AC represents Access Accept.

In the first embodiment of the present invention, ID utilization for each server is used to estimate the load status of the server. In other words, in FIG. 3, if each server calculates ID utilization of its ID buffer, ID utilization for the first server is 200/256=0.78, ID utilization for the second server is 140/256=0.54, and ID utilization for the third server is 100/256=0.39. These values are used as load status estimates. Based on these values, the client may determine a server to which it will send an access request message for a new network. In the example of FIG. 3, if a new access request message occurs, the client selects the third server, an ID buffer for which has the lowest ID utilization now, and sends the new access request message to the selected third server.

Based on the load status estimates for the servers, the client may determine whether to drop or discard the access request message it will send to the server. For example, after the maximum and minimum thresholds for the load status are set, if ID utilization of an ID buffer for a server is less than or equal to the minimum threshold, the client sends an access request message. If the ID utilization is greater than or equal to the maximum threshold, the client drops the access request message at all times. If the ID utilization is a value between the maximum and minimum values, the client determines whether to drop the access request message by stochastic. By doing so, the client may control the flow of the servers.

Figure 4:
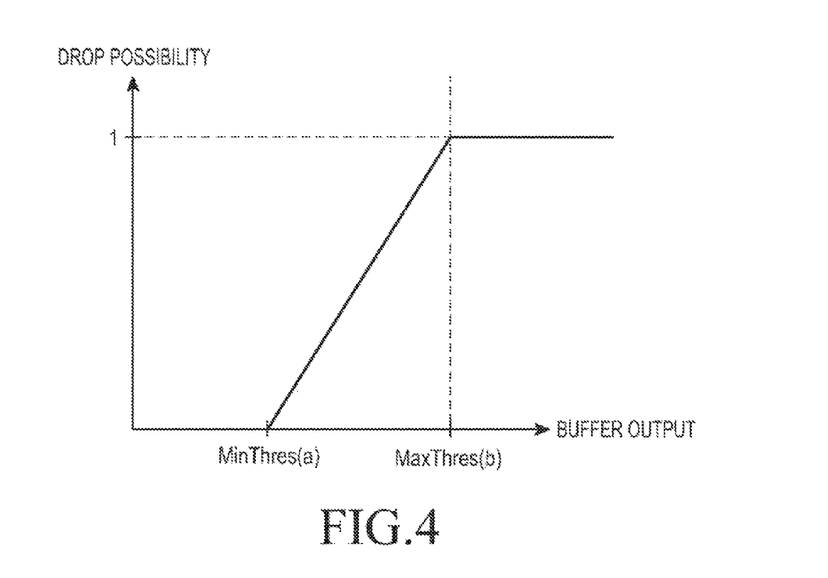
FIG. 4 shows a function for controlling a flow of a server according to the first embodiment of the present invention.

FIG. 4 shows a function for controlling a flow of a server according to the first embodiment of the present invention. In FIG. 4, the Y-axis represents a message drop possibility, and the X-axis represents Buffer Output (BO). If the minimum threshold is defined as 'a' and the maximum threshold is defined as 'b', the message drop possibility may be determined by Equation (1) below.

MathFigure 1

[Math.1]

$$Y=(BO-a)/(b-a) \quad (1)$$

Figure 5:
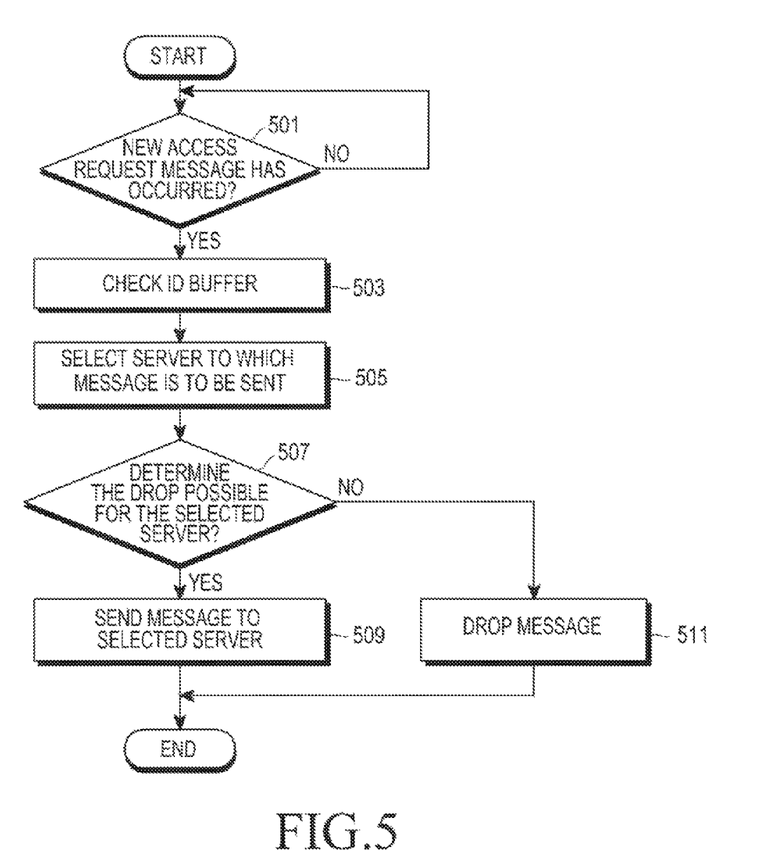
FIG. 5 is a flowchart showing an operation of a client according to the first embodiment of the present invention.

FIG. 5 is a flowchart showing an operation of a client according to the first embodiment of the present invention.

Referring to FIG. 5, the client determines in step 501 whether a new access request message has occurred. If it is determined that a new access request message has occurred, the client checks its ID buffers in step 503. In step 505, the client selects a server, an ID buffer for which has the lowest ID utilization, as a server to which it will send the new access request message. In step 507, the client determines the drop possibility for the selected server in accordance with Equation (1). In other words, if ID utilization of an ID buffer for the selected server is less than or equal to the maximum threshold, the client determines that the new access request message may not be handled. In step 509, the client sends the new access request message to the selected server. However, if it is determined that the ID utilization of an ID buffer for the selected server is greater than or equal to the maximum threshold, the client drops the new access request message in step 511, determining that the new access request message may not be handled.

Figure 6:
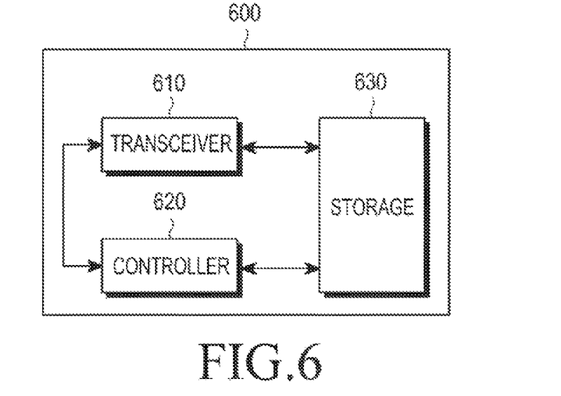
FIG. 6 shows a structure of a client according to the first embodiment of the present invention

FIG. 6 shows a structure of a client according to the first embodiment of the present invention.

Referring to FIG. 6, a client 600 according to the first embodiment of the present invention includes a transceiver 610, a controller 620, and a storage 630.

The transceiver 610 receives a new access request message and sends it to a server under control of the controller 620. The storage 630 maps an ID allocated by the controller 620 to the new access request message, and stores the mapping results in an ID buffer. The controller 620 manages and updates IDs and messages stored in the ID buffer. The controller 620 selects a server, to which it will send the new access request message received at the transceiver 610, based on the ID utilization of the ID buffer, determines whether to drop the access request message, and controls the transceiver 610 depending on the determinations.

Second Embodiment

A second embodiment of the present invention provides a method in which a server provides load status information to a client in real-time, and the client receives the load status information and performs load balancing based on the received load status information. In other words, in the second embodiment of the present invention, an indicator indicating the load status of the server is provided to the client, using the existing response message for authentication and accounting. Further, InBand Signaling and Vender-Specific Attribute Value Parameter (AVP) are used so that the embodiment may be applied not only to the RADIUS protocol but also to the Diameter protocol.

An indicator of load status information that a server may provide to a client, may include, for example, a buffer load level, a load level of a Central Processing Unit (CPU), and the number of subscribers. When sending a response message to the client, the server sends the indicators of load status information together, and the client acquires the indicators of load status information and determines the load status of the server based on the indicators. For example, let's say that when the buffer load is 100%, a load level is 2. In this case, the client determines that the server has lower load as its load level is higher. As for the indicators of load status information, all or some of the above-mentioned kinds of indicators may be transmitted. The client determines a weight for each of the indicators of load status information, and may finally determine the load of the buffer and the load of its associated server depending on the determined weight for each of the indicators of load status information. The client stores the determined load status information for the servers, and when receiving a new access request message in the future, the client uses the stored load status information as the criteria for handling the access request message.

Figure 7:
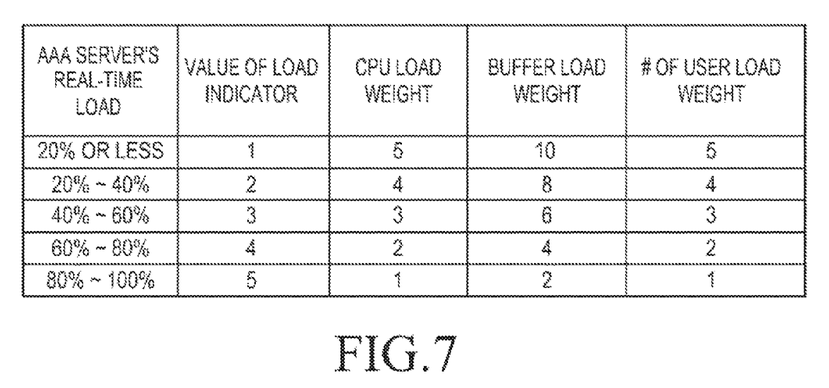
FIG. 7 shows weights for indicators of load status information according to the second embodiment of the present invention.

FIG. 7 shows weights for indicators of load status information according to the second embodiment of the present invention.

Figure 8:
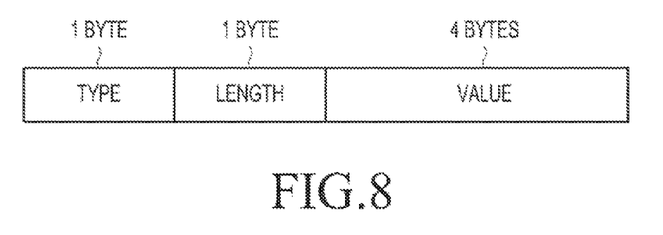
FIG. 8 shows an AVP format including an indicator of load status information, which is to be applied to a RADIUS protocol, according to the second embodiment of the present invention.

FIG. 8 shows an AVP format including an indicator of load status information, which is to be applied to a RADIUS protocol, according to the second embodiment of the present invention.

Referring to FIG. 8, for example, an AVP format includes a 1-byte type field, a 1-byte length field, and a 4-byte value field. The indicator of load status information according to the second embodiment of the present invention is included in the value field.

Figure 9:
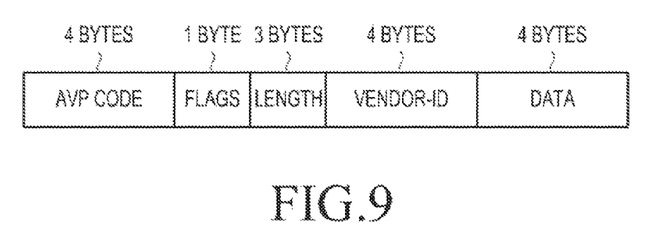
FIG. 9 shows an AVP format including a load indicator, which is to be applied to a Diameter protocol, according to the second embodiment of the present invention.

FIG. 9 shows an AVP format including a load indicator, which is to be applied to a Diameter protocol, according to the second embodiment of the present invention.

Referring to FIG. 9, an AVP format includes a 4-byte AVP code field, a 1-byte flags field, a 3-byte length field, a 4-byte vendor-ID field, and a 4-byte data field. The indicator of load status information according to the second embodiment of the present invention is included in the data field.

Figure 10:
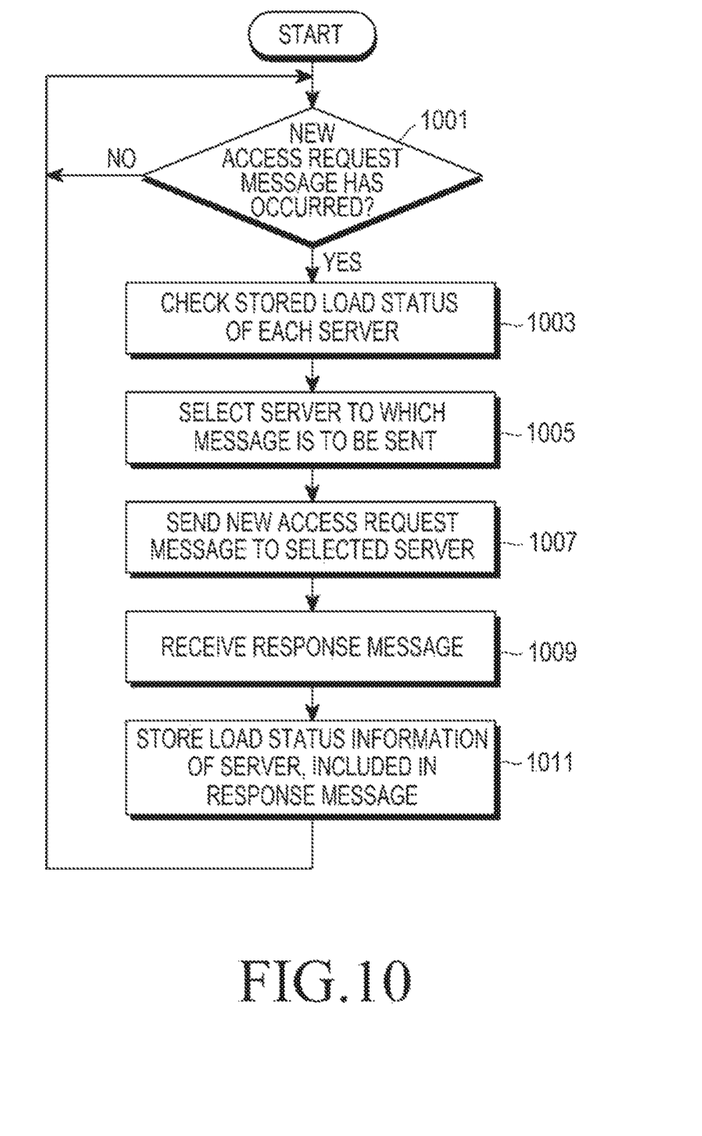
FIG. 10 is a flowchart showing an operation of a client according to the second embodiment of the present invention.

FIG. 10 is a flowchart showing an operation of a client according to the second embodiment of the present invention.

Referring to FIG. 10, the client determines in step 1001 whether a new access request message has occurred. If it is determined that a new access request message has occurred, the client checks stored load status of each server in step 1003. In step 1005, the client selects a server having a buffer with the lowest load level as a server, to which it will send the new access request message, based on the checked load status. In step 1007, the client sends the new access request message to the selected server. In step 1009, the client receives a response message to the access request message. In step 1011, the client checks and stores the load status information of the server, which is included in the response message, and then returns to step 1001.

In step 1007, as described in the first embodiment of the present invention, the client checks drop possibility of the new access request message for the selected server based on the drop possibility function of Equation (1), and sends the new access request message to the selected server, only if it is determined that the new quest message may not be handled, since ID utilization of an ID buffer corresponding to the server is less than the maximum threshold. The client may drop the new access request message, if it is determined that the new access request message may not be handled, since the ID utilization of the ID buffer exceeds the maximum threshold.

When selecting a server through steps 1003 and 1005, the client may simultaneously consider the ID buffer proposed in the first embodiment of the present invention.

The client according to the second embodiment of the present invention may be constructed as described with reference to FIG. 6.

Referring to FIG. 6, the transceiver 610 of the client 600 according to the second embodiment of the present invention performs an operation of receiving a new access request message and sending it to a server under control of the controller 620. The storage 630 stores buffer status information for each server. The controller 620 manages and updates the buffer status information for each server, which is stored in the storage 630. The controller 620 selects a server to which it will send the new access request message, based on the buffer status information for each server.

The invention claimed is:

1. A method for balancing load of a server by a terminal in a communication system, comprising:
 checking, by the terminal, a load status of each of a plurality of servers by identifying an identification (ID) utilization of buffers of each of the plurality of servers, where the ID utilization of the buffers indicates the load status of each of the plurality of servers;
 selecting, by the terminal, a server among the plurality of servers based on the load status of the plurality of servers; and
 sending, by the terminal, a first access request message to the selected server based on identifying whether an ID utilization of a buffer, in the terminal, corresponding to the selected server is less than a threshold,
 wherein the first access request message is sent to the selected server if the ID utilization of the buffer is less than the threshold.

2. The method of claim 1, wherein the buffer corresponding to each of the servers maps an unused ID among all of predetermined IDs to a message received from the terminal and stores the mapping results.

3. The method of claim 2, wherein the ID utilization of the buffer is determined considering a number of IDs, to which messages are mapped, among all of the IDs.

4. The method of claim 1, further comprising storing load status information from the selected server.

5. The method of claim 4, wherein the load status information includes at least one of a buffer load level of the selected server, a load level of a central processing unit (CPU) of the selected server, and a number of subscribers.

6. The method of claim 4, wherein the load status information is indicated using an attribute value parameter (AVP).

7. The method of claim 1, further comprising:
 identifying that a second access request message occurs; and
 checking the load status of the servers if the second access request message is received.

8. An apparatus for balancing load of a server by a terminal in a communication system, comprising:
 a transceiver configured to send a first access request message to a server; and
 a controller configured to:
  check a load status of servers,
  select the server among a plurality of servers based on the load status of the plurality of servers by identifying an identification (ID) utilization of buffers of each of the plurality of servers, where the ID utilization of the buffers indicates the load status of each of the plurality of servers,
  identifying whether an ID utilization of a buffer, in the terminal, corresponding to the selected server is less than a threshold, and
  control the transceiver to send the first access request message to the selected server based on the identification,
  wherein the first access request message is sent to the selected server if the ID utilization of the buffer is less than the threshold.

9. The apparatus of claim 8, wherein the buffer corresponding to each of the servers maps an unused ID among all of predetermined IDs to a message received from the terminal and stores the mapping results.

10. The apparatus of claim 9, wherein the ID utilization of the buffer is determined considering a number of IDs, to which messages are mapped, among all of the IDs.

11. The apparatus of claim 8, wherein if the transceiver receives load status information from the selected server, the controller is configured to store the load status information.

12. The apparatus of claim 11, wherein the load status information includes at least one of a buffer load level of the selected server, a load level of a central processing unit (CPU) of the selected server, and a number of subscribers.

13. The apparatus of claim 11, wherein the load status information is indicated using an attribute value parameter (AVP).

14. The apparatus of claim 8, wherein the controller is further configured to identify that a second access request message occurs and check the load status of the servers if the second access request message is received.

* * * * *